United States Patent
Williams (10) Patent No.: US 7,468,695 B1
(45) Date of Patent: Dec. 23, 2008

(54) GPS ATTITUDE DETERMINATION SYSTEM AND METHOD USING BASELINE EXTENSION

(75) Inventor: Darin S. Williams, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 11/780,270

(22) Filed: Jul. 19, 2007

(51) Int. Cl.
*G01S 5/14* (2006.01)
*G01C 21/00* (2006.01)

(52) U.S. Cl. .................................. 342/357.11; 701/215
(58) Field of Classification Search ............. 342/357.11
See application file for complete search history.

(56) References Cited

U.S. PATENT DOCUMENTS

| | | | | |
|---|---|---|---|---|
| 4,949,089 | A | * | 8/1990 | Ruszkowski, Jr. ............ 342/52 |
| 6,369,755 | B1 | * | 4/2002 | Nichols et al. ......... 342/357.17 |
| 6,463,366 | B2 | * | 10/2002 | Kinashi et al. ................ 701/13 |
| 6,507,738 | B1 | * | 1/2003 | Allison et al. ................ 455/427 |
| 7,292,185 | B2 | * | 11/2007 | Whitehead et al. ...... 342/357.11 |

OTHER PUBLICATIONS

Institute of Navigation, Satellite Division, "Instantaneous GPS Attitude Determination," Proceedings of the ION GPS-93 Sixth International Technical Meeting of the Satellite Division of the Institute of Navigation, Sep. 22-24, 1993, pp. 603-615.

* cited by examiner

*Primary Examiner*—Gregory C Issing
(74) *Attorney, Agent, or Firm*—The Noblitt Group, PLLC (57) ABSTRACT

The baseline of a GPS attitude determination system is extended beyond the confines of the platform to improve attitude determination. A structurally detached GPS antenna is located away from the platform defining an extended baseline to a body-fixed GPS antenna attached to the platform with an unknown orientation with respect to the platform. An electro-optical (EO) sensor on the platform acquires an EO observable reference feature on the remote GPS antenna and measures the extended baseline orientation with respect to the orientation of the platform. A processor processes GPS data, positional or interferometric, from both GPS antennas to determine the extended baseline orientation in a reference coordinate system. The first and second baseline orientations determine platform attitude.

20 Claims, 6 Drawing Sheets

GPS ATTITUDE DETERMINATION SYSTEM AND METHOD USING BASELINE EXTENSION

BACKGROUND OF THE INVENTION

1. Field of the Invention

This invention relates to GPS attitude determination and more specifically to a system and method of improved attitude determination using baseline extension.

2. Description of the Related Art

Attitude determination is of interest in such applications as aircraft and spacecraft control, artillery pointing, target designation and inertial navigation system attitude initialization. Attitude determination provides a "platform's" sight orientation within a reference coordinate system. Full attitude determination is typically specified in terms of yaw, pitch and roll. In some circumstances it is not necessary to disambiguate roll, this is referred to as pointing attitude. Typical solutions include flux compasses, inertial systems and GPS systems. Flux compasses are often used but are relatively inaccurate and easily disturbed by the environment, namely the presence of metal. Inertial solutions are expensive and have other problems.

GPS attitude determination systems can be either position based or interferometric. Position based systems use the geo-location readout (x,y,z) from two conventional GPS receivers connected to the pair of body-fixed antenna to calculate the attitude (yaw, pitch) of the baseline connecting the two GPS antennas. A third antenna or downfinder is required to determine the full-attitude including roll about the baseline. The orientation of the baseline (the line connecting the two GPS antenna) relative to the platform is fixed and known a priori. Thus, determination of the baseline attitude uniquely determines platform attitude. Interferometric systems use the geo-location read from one (or fuzed from both) of the conventional GPS receivers and calculate the attitude from the relative phases of the carriers for each satellite at both of the body-fixed antennas. Interferometric GPS is approximately an order of magnitude (10×) more accurate than position based GPS. A complete explanation of Interferometric GPS is provided in Paul Quinn "Instantaneous GPS Attitude Determination", Proceedings of ION GPS-93, Part 1, Salt Lake City, Utah Sep. 22-24, 1993, pp. 603-615, which is hereby incorporated by reference.

In both the positional and interferometric GPS systems, the accuracy of the attitude determination is inversely proportion to the length of the baseline connecting the pair of body-fixed antenna (the error in locating the end points is roughly independent of the baseline length and the attitude error is the endpoint error divided by the length). Consequently, in fielded systems such as aircraft, satellites or targeting systems, the pair of antenna are typically mounted on the platform with the maximum practical separation at a known orientation to the platform, e.g. opposite corners of the platform. Quinn states "The attitude of a rigid body may be determined from the GPS phase observations from three or more antennas attached to the body" (P. 604, col. 1, lines 4-7). In describing a specific practical GPS attitude system, Quinn discloses that "All antennas were located on the corners of a one meter square" (P. 613, col 2, lines 13-15).

SUMMARY OF THE INVENTION

The present invention provides a GPS attitude determination system and method with improved accuracy. The described system can be used to either replace or augment existing attitude determination systems.

This is accomplished by extending the baseline beyond the physical dimensions or confines of the platform thereby improving the accuracy of attitude determination. A structurally detached GPS antenna is located away from the platform defining an extended baseline to a body-fixed GPS antenna attached to the platform with an unknown orientation with respect to the platform. Communication means are provided to communicate GPS data between the detached GPS antenna and the platform. An electro-optical (EO) sensor on the platform has a field-of-view to acquire an EO observable reference feature on the remote GPS antenna or vice-versa. The EO sensor acquires the observable feature and measures the extended baseline orientation with respect to the orientation of the platform. A processor processes GPS data, positional or interferometric, from both GPS antennas to determine the extended baseline orientation in a reference coordinate system. The processor then combines the two extended baseline orientations with a platform pitch to determine the platform's attitude. The pitch can be found, for example, by assuming a known pitch, using a downfinder on the platform to measure pitch or using an additional GPS antenna either on or off the platform.

These and other features and advantages of the invention will be apparent to those skilled in the art from the following detailed description of preferred embodiments, taken together with the accompanying drawings, in which:

DETAILED DESCRIPTION OF THE INVENTION

The present invention describes a GPS attitude determination system and method with improved accuracy. The term "GPS" as used herein refers to any transmitter referenced geo-location system including, for example, the deployed satellite based GPS and the new Galileo system or a terrestrial based system such as LORAN. The present invention utilizes the available GPS infrastructure and manipulates the GPS data provided to a GPS antenna in known ways to determine attitude. The details of GPS are well known to those of ordinary skill in the art and beyond the scope of the present invention.

As described above, it is well known that the accuracy of GPS attitude determinations systems (both geo-locational and interferometric) is inversely proportional to the length of the baseline between the pair of GPS antennas. The errors in determining the endpoints of the baseline are relatively fixed, and the error in determining the attitude of the baseline is nominally proportional to the end point error divided by then length of the baseline. The longer the baseline the better the accuracy of the attitude measurement. Instead of maximizing the separation between two body-fixed GPS antennas, the present invention attaches one GPS antenna to the platform and positions a second GPS antenna away from the platform to define an extended baseline of greater length. The second GPS antenna is structurally detached from the platform (i.e. not body-fixed). This has not been done previously because to do so removes an essential piece of knowledge, the a-priori known orientation of the baseline with respect to the platform. Because the second GPS antenna is detached from the platform, the system must also provide means to acquire the GPS antenna and determine its orientation with respect to the platform and means to communicate the received GPS data back to the platform. Additional detached GPS antenna can be used to resolve roll uncertainty about the first baseline. This simultaneously over determines the system to further improve the robustness and accuracy of the attitude measurement. Additional detached GPS antenna(s) may also increase the range of platform motion over which the platform will acquire at least one detached GPS antenna.

The described system can be designed as a standalone GPS attitude determination system with baseline extension or as a 'baseline extension system' for use with existing attitude determination systems. The invention is particularly useful in man-portable terrestrial systems such as a target designation system in which both the platform and additional GPS antennas are man portable or for a terrestrial platform and man-portable remote GPS antenna. Existing target designation systems can be readily modified to incorporate baseline extension.

Figure 1A:
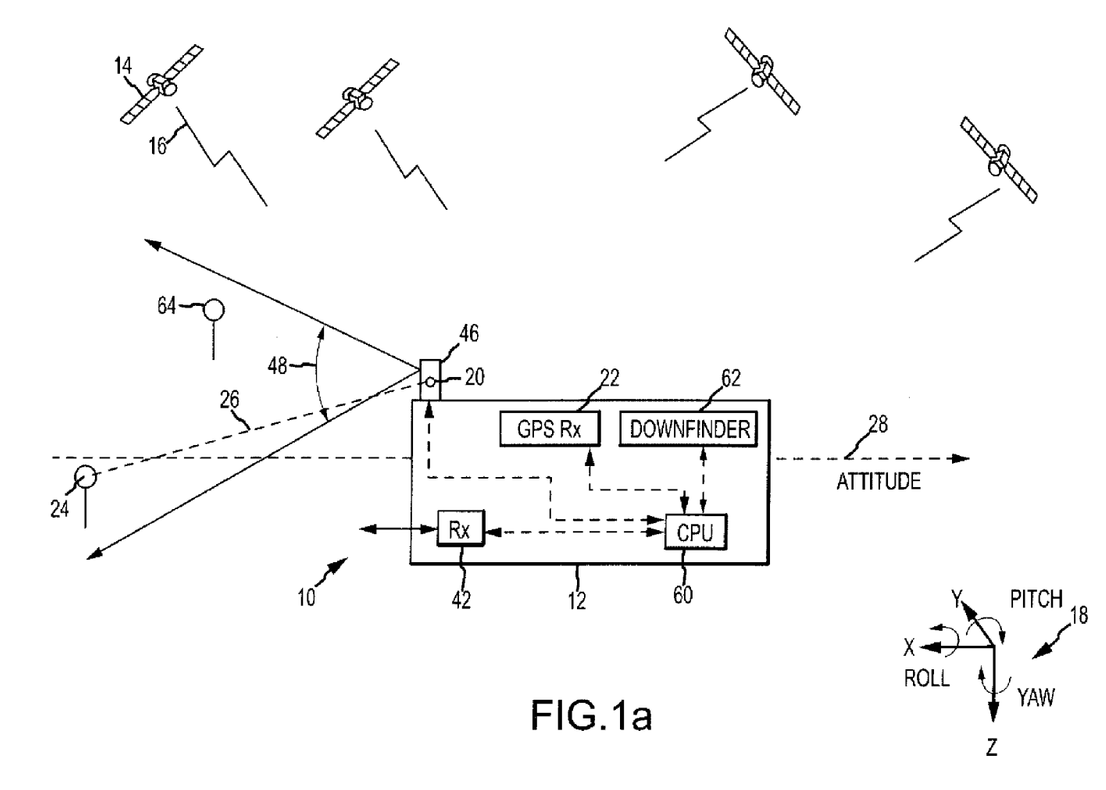
FIGS. 1a and 1b are side and top views, respectively of a GPS attitude determination system using baseline extension in accordance with the present invention.
Figure 1B:
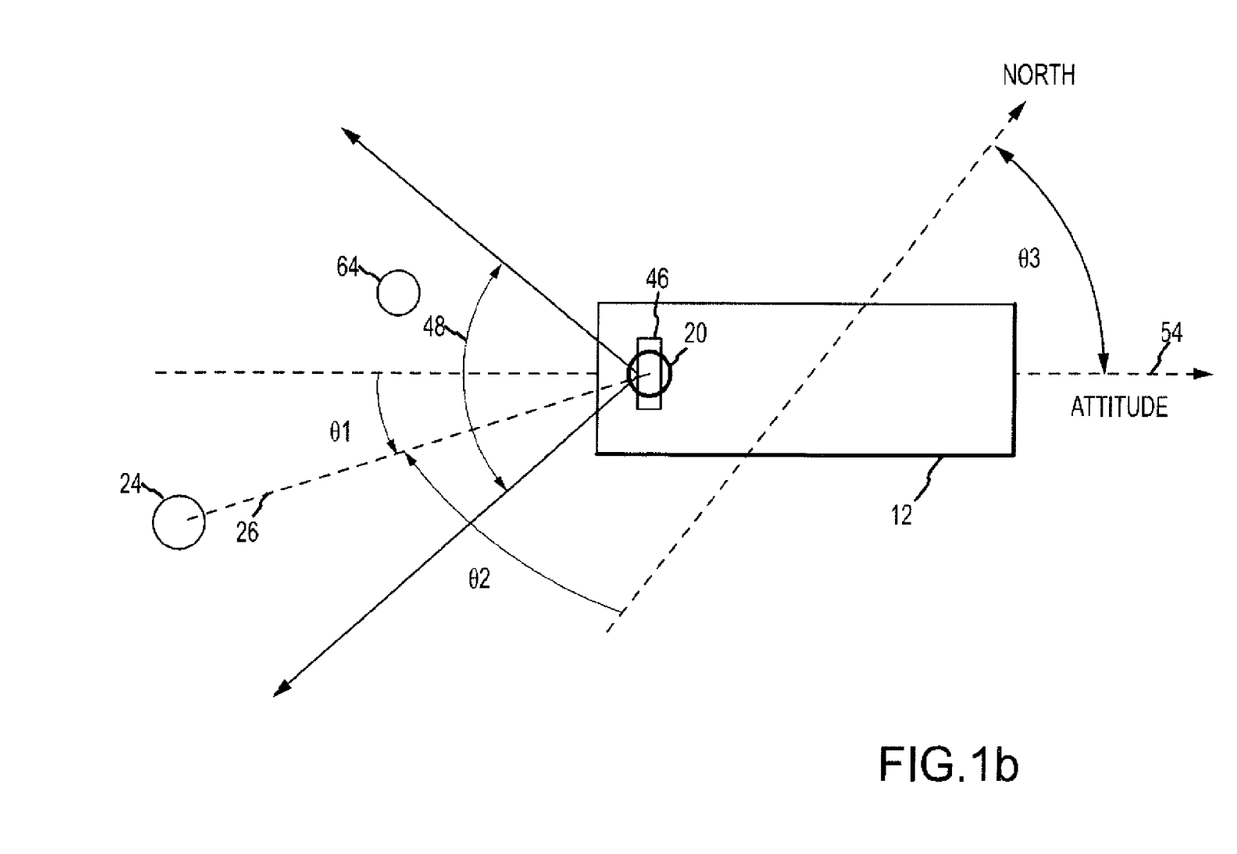
Figure 2A:
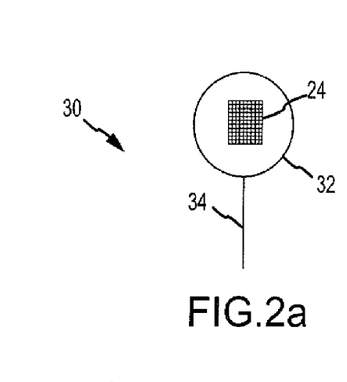
FIGS. 2a and 2b are respectively an embodiment of a GPS ball and its block diagram.
Figure 2B:
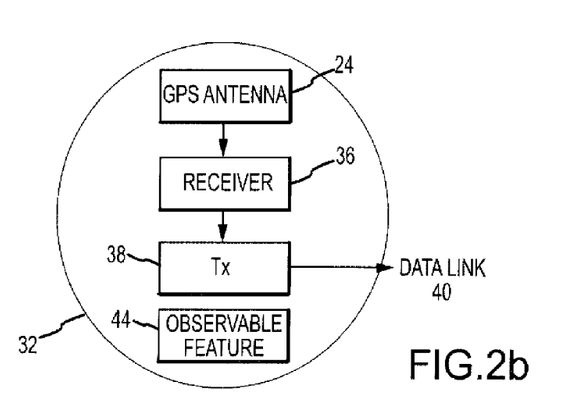
Figure 3A:
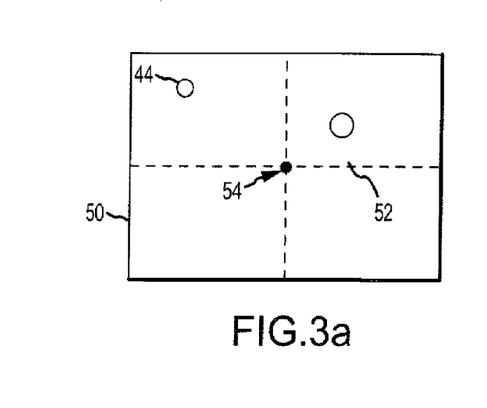
FIGS. 3a-3b are respectively an image of the detached GPS antenna acquired by the EO sensor and a simplified optical system of the EO sensor.
Figure 3B:
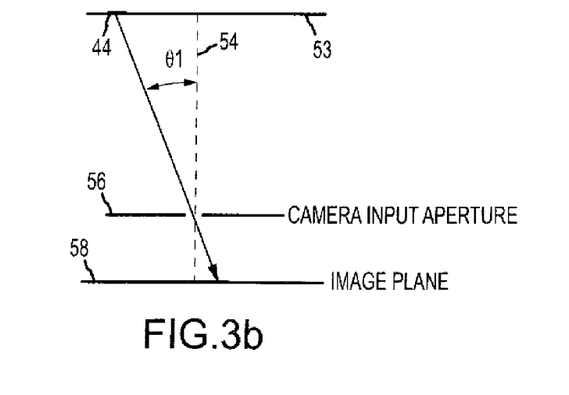

An embodiment of a standalone GPS attitude determination system 10 for a platform 12 is illustrated in FIGS. 1-3. The 'platform' can be any structure, stationary or moving, such as land, air, sea or spacecraft, artillery piece or a targeting system for designating remote targets. A GPS includes a network of satellites 14 (GPS transmitters) that broadcast GPS data 16, which includes the satellite position in a reference coordinate system and a code embedded in a carrier wave. By looking at a minimum of four satellites, a GPS antenna and receiver can uniquely determine its geo-location (x,y,z) in a reference coordinate system 18, e.g. inertial, Earth or other. By looking at the same four satellites, a pair of GPS antennas can determine the attitude, i.e. the orientation (yaw and pitch) in reference coordinate system 18, of a baseline 26 connecting the two GPS antennas.

GPS attitude determination system 10 includes a first GPS antenna 20 and GPS receiver 22 attached to platform 12 to receive GPS data 16 from multiple satellites 14 and a second GPS antenna 24 structurally detached and positioned away from platform 12 to receive GPS data 16 from at least some of the same satellites. Full-positioning mode requires the GPS antenna to receive GPS data from at least four of the same satellites. The positioning of the second GPS antenna defines extended baseline 26 to the first GPS antenna that extends outside the confines of the platform at an unknown orientation; unknown both in the reference coordinate system 18 and with respect to the sight orientation in the reference coordinate system (attitude) 28 of the platform itself.

The second GPS antenna 24 is suitably part of a man-portable GPS assembly 30 that the user can position relative to the platform as desired. The GPS antenna is suitably centered within a sphere 32, hereinafter referred to as the "ball", and positioned to be visible to the platform. The ball may be mounted on a stake 34, as shown, or in other configurations to improve visibility to the platform. The sphere is used to eliminate any error dependency upon the angle from which the GPS antenna is observed. Other configurations for the GPS antenna and means for positioning the antenna are contemplated by the invention. For example, for spacecraft platforms the second GPS antenna can be trailed by a light and flexible tether.

GPS assembly 30 suitably includes the GPS antenna 24, a receiver 36 that monitors the data received by the antenna and extracts enough information to support the attitude measurement, a transmitter 38 that transmits the information over a data link 40 back to a receiver 42 on the platform and an EO observable feature 44. Receiver 36 can be configured to provide full GPS receiver functionality although that is not necessary for the attitude measurement. The receiver could simply repeat the de-spread GPS carrier for the different satellites and allow the platform to process the information but this requires more bandwidth. Alternately, the receiver could extract only the relevant information, e.g. the geo-location of the antenna for geo-location based attitude determination or time-tagged measurements of the carrier phase differences for each satellite for interferometric based attitude determination. The information can be transferred via a standard wired data link and electrical signal, a wireless data link and RF signal, or through the air with an optical signal. Optical data transfer could be accomplished by modulating light generated in the ball (e.g. an LED array) or by modulating light from an external source of illumination (e.g. the platform) using, for example, a retro-reflector. The particular means of communication between the ball and platform is application dependent. The ball is suitably constructed to provide the EO observable feature 44 that is used to acquire the ball and determine the baseline orientation with respect to the platform. This feature may, for example, be the size, shape, color and/or static or pulsing illumination of the ball. For example, the LEDs or retro-reflector could be used to first acquire the ball and then to transfer the GPS information. Essentially, the feature can be anything that is easily and reliably detectable by an electro-optic sensor such as a camera. For security reasons, the optical signal may be suitably invisible to the naked eye, e.g. IR or near-visible bands. Because the feature is known a priori the detection software knows what to look for, which makes the problem of acquisition manageable using techniques well known to those skilled in the art of EO detection. The optical beacon is particularly useful in troublesome lighting conditions or at long ranges.

The GPS attitude determination system 10 also includes an EO sensor 46 (e.g. a visible or near-visible band strap-down camera or lateral effects diode) on platform 12. EO Sensor 46 and GPS antenna 20 are suitably located at or near the same position on the platform to minimize parallax. GPS antenna 20 is a 'patch' antenna then can be positioned next to the aperture of the EO sensor. Alternately, the sensor and antenna can be positioned at different locations on the platform and a parallax correction, which would be dependent on the range to the second GPS antenna, performed. EO Sensor 46 images a field-of-view 48 to acquire the EO observable feature 44 provided by ball 32 in an image frame 50. Multiple frames are suitably but not necessarily processed to reduce noise. Although the sensor is depicted to image a FOV behind the platform, the sensor can be oriented and the ball positioned at any orientation and elevation with respect to the platform so long as the ball is within the sensor's FOV. The cross-hairs 52 of the image frame are suitably aligned with the attitude 54 of the platform (or at a known angle thereto). As depicted for a very simple optical system for the EO sensor, light from observable feature 44 in a scene 53 is collected at angle $\theta 1$ with respect to attitude 54 through the camera input aperture 56 onto an image plane 58 to form image frame 50. Detection software either resident in the EO sensor itself or in a platform CPU 60 detects the observable feature from scene 53 and determines its position in the frame. Detection may be fully automated or potentially require/request/allow for operator verification of the ball. Knowing the geometry of the optical system it is a simple calculation to derive θ1, which is the orientation of the extended baseline 26 with respect to the platform's attitude. Any optical distortion for the sensor may be pre-calculated and corrected prior to use.

The reason for providing baseline extension is to improve the accuracy with which the platform attitude 54 (θ3 with respect to North in Earth coordinates in this example) is determined. θ3 is determined as the sum of the angle of the baseline extension relative to the platform (θ1) and the angle of the baseline extension relative to the reference frame (θ2). Any error in the measurement of θ1 or θ2 will degrade θ3, the overall attitude measurement. The error in θ1 increase slightly as the ball is positioned further and further away due to having a smaller number of pixels on target, but it remains small. However, the error in θ2 decreases quickly, being the quotient of a relatively fixed positioning error and the length of the baseline. It is critical to overall system performance that placing the ball further away, within useful ranges, improves the GPS attitude accuracy faster than it degrades the ability to measure the position of the ball to calculate θ1. Consider the following example. Suppose the EO sensor allows the ball (10 cm diameter) to be placed anywhere with a 45 degree FOV and that the sensor has 2000 pixels per side. At 20 meters, the ball would image about 13 pixels across it's diameter, which is sufficient to average out pixel phase effects across the boundary and allow the position of the ball in the FOV to be calculated to $<<1/10$ pixel or to better than 40 micro-radians of angle. The error contribution for the θ1 measurement is thus relatively small. To a first order approximation, the total attitude measurement error is linear with the distance to the ball.

In many circumstances it is not necessary to measure the full-attitude; yaw, pitch and roll. The pointing-attitude, which does not specify the roll angle, is often adequate. The GPS attitude determination system, by itself can not measure roll orientation about a single baseline. When the orientation of the extended baseline 26 is anti-parallel to the platform attitude 54, this corresponds to roll about the line of sight 54 and may be disregarded. However, the orientation of the extended baseline 26 is typically not anti-parallel to the platform attitude 54 (as the ball can be placed at any unknown orientation to the platform). In this case, roll about the GPS baseline causes the platform attitude 54 to sweep out a circle, inducing yaw/pitch as well as roll uncertainty. To resolve this in the general case it is necessary to determine the roll angle whether measuring the full-attitude or only pointing attitude.

To disambiguate the roll angle, the CPU needs to know the pitch of the platform. In some circumstances, typically when the platform is known to be level, the pitch can be assumed. More typically means are provided to measure pitch. A downfinder 62 on the platform measures the pitch relative to gravity. Alternately, a third GPS antenna 64 can be used to disambiguate roll. This third GPS antenna can be placed either on the platform or remotely although accuracy improves with separation distance. If the third GPS antenna is used in conjunction with the downfinder the system is over determined, which makes the attitude measurement more robust and a bit more accurate. The third GPS antenna can also increase the range of platform motion over which at least one remote GPS antenna will be acquired to provide an extended baseline.

Platform CPU 60 receives either the raw data or the calculated extended baseline orientation θ1 from EO sensor 46, receives GPS data from the two GPS antennas 20 and 24, pitch data from the downfinder 62 and/or GPS antenna 64 and calculates the extended baseline orientation θ2 in the reference coordinate system (e.g. extended baseline attitude). This calculation can be performed via geo-location GPS or interferometric GPS. The CPU 60 then simply adds θ1+θ2 to estimate the sight orientation θ3 of the platform in the reference coordinate system (e.g. the platform attitude). In this example, the reference coordinate system is the Earth frame of reference and the attitude is measured with respect to North.

Although not shown in this embodiment the platform will also typically include an inertial system to augment and improve the GPS system. The inertial system provides stabilization for any platform movement and time interpolated measurements to compensate for the limited update rate and accuracy of the GPS. The integration of inertial and GPS is well known to those skilled in the art. The platform may also include a transmitter for transmitting the determined platform attitude. For example, if used in a target designation system, the system will determine the geo-location of the target and transmit that information.

Although it is expected that processing to determine platform attitude would be performed on-board the platform this is not required. The EO sensor could be co-located with the ball and detect an observable feature on the platform in order to determine the orientation with respect to the baseline and the GPS data received on the platform could be transferred to the ball for processing. The ball could then transmit platform attitude back to the platform or elsewhere as required.

Furthermore, although the remote GPS antenna are 'structurally detached' from the platform and positioned away from the platform to provide an extended baseline the remote GPS antenna could be loosely 'tethered' to the platform. For example, in a terrestrial system a tether between the platform and remote GPS antenna may make it easier to locate the GPS antenna if and when the platform is moved or the tether might constrain the maximum extended baseline at which the GPS antenna can be reliably acquired by the EO sensor. In a non-terrestrial system, the second antenna could simply be flying at some distance from the platform or a tether could prevent the remote GPS antenna from floating away. The tether is not equivalent to a mechanical-mast that could extend the GPS antenna some distance away from the platform. A GPS antenna on a mechanical-mast is still considered to be body-fixed because its baseline to the other attached GPS antenna is known and the orientation of the baseline with respect to the platform is known either a-priori, or by measuring deformations in the mast. The position of a loosely tethered remote GPS antenna would be unknown. The antenna would have to be acquired and it's positioned measured by the EO sensor as described.

Figure 4:
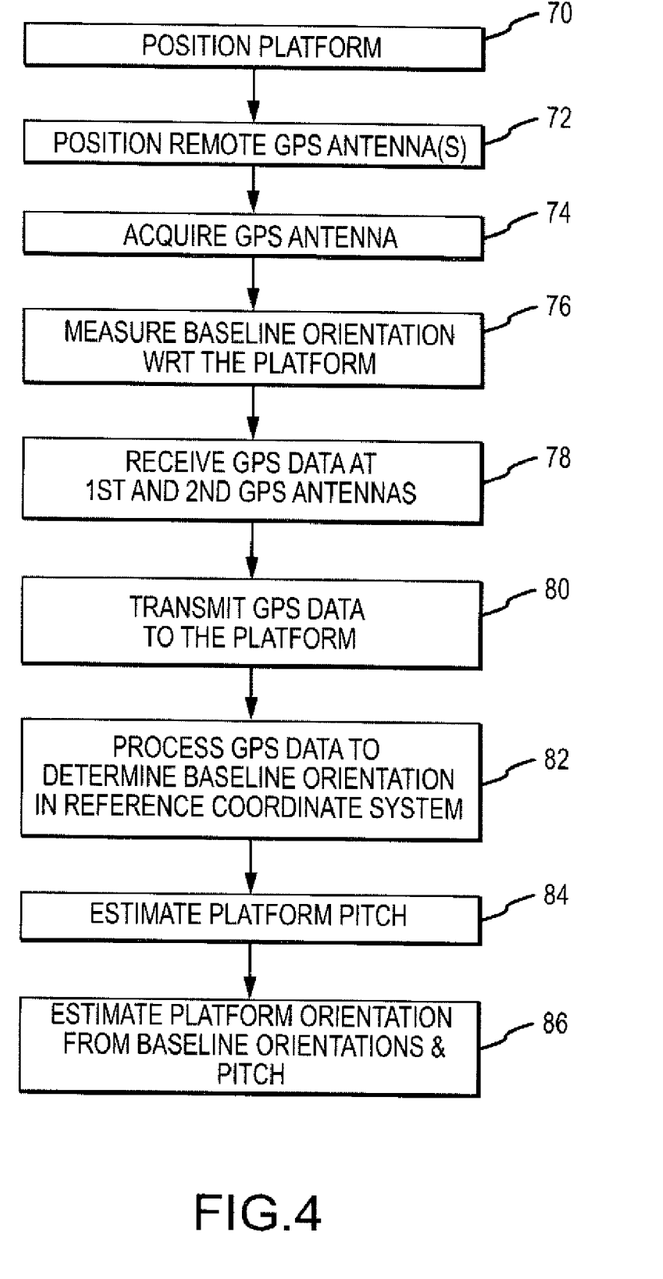
FIG. 4 is a flowchart of for determining platform attitude using baseline extension.

As detailed in FIG. 4, the process of baseline extension for GPS attitude determination includes positioning the platform with a body-fixed GPS antenna (step 70) and positioning at least one structurally detached GPS antenna in the FOV of the platform (step 72). The order of performing these steps is not critical and will depend on the application. The system acquires the GPS antenna with an EO sensor (step 74) and measures the extended baseline orientation with respect to the platform (step 76). GPS data is received at the platform and remote GPS antennas from the satellite network (step 78) and the remotely acquired data is transmitted to the platform (step 80). All of the acquired UPS data may be forwarded or only enough information to support attitude determination. The GPS data is processed using known geo-location or interferometric techniques to measure the extended baseline orientation in the reference coordinate system (step 82). The platform pitch is measured (step 84) and the platform orientation in the reference coordinate system (platform attitude) is estimated from the extended baseline orientations and the platform pitch (step 86). Additional remote UPS antennas may be used to over determine the system to improve the robustness and the accuracy of the attitude measurement.

Figure 5:
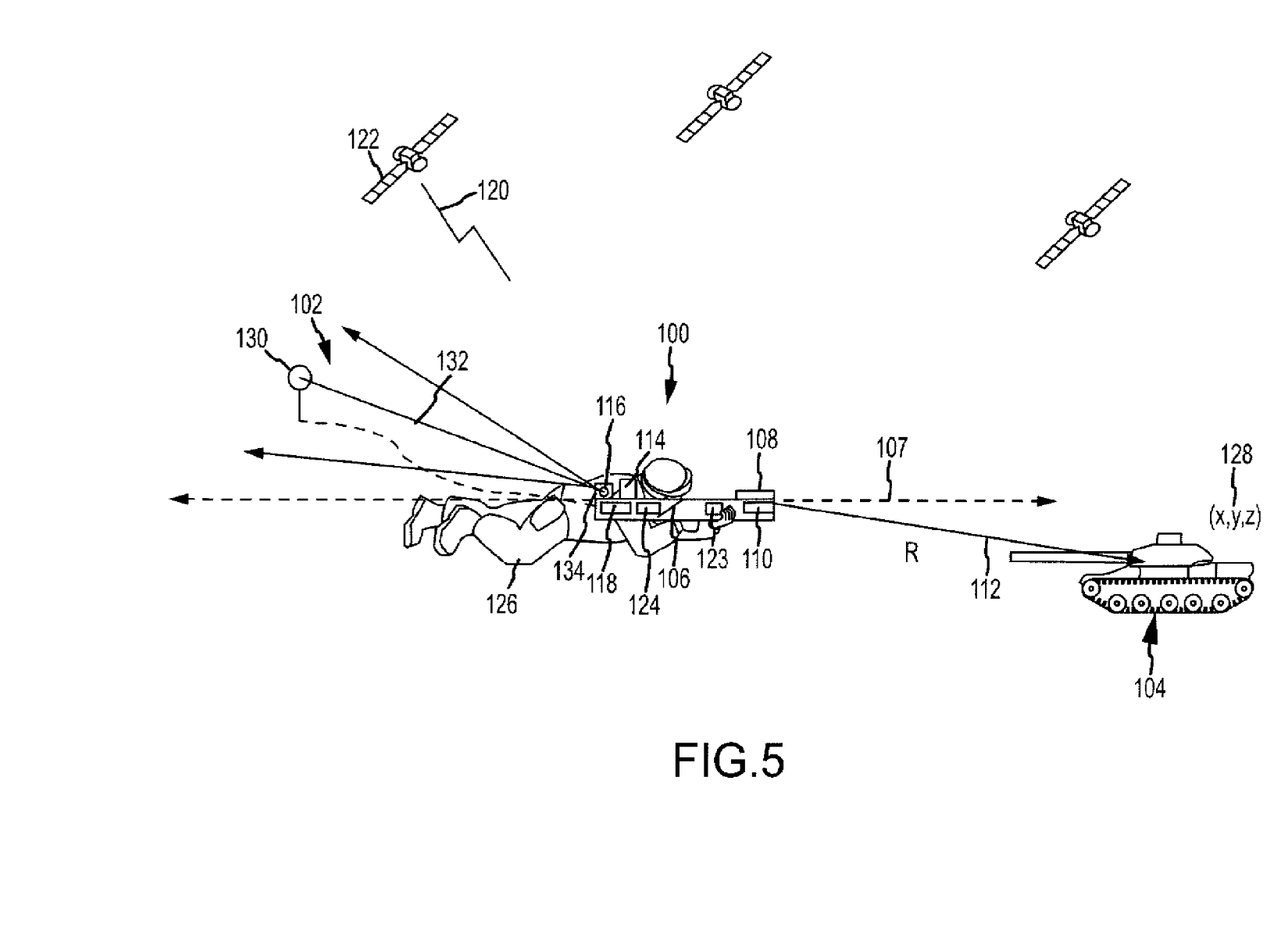
FIG. 5 is a diagram of a man-portable targeting system with a baseline extension system.

An embodiment of a man-portable targeting system 100 with a baseline extension system 102 is illustrated in FIG. 5. The man-portable targeting system 100 contains a self-contained attitude determination such as a flux compass, inertial or GPS system that is capable of measuring the targeting platform's attitude with a certain accuracy. The baseline extension system provides for GPS determination of the attitude, geo-location or interferometric, with an extended baseline that improves attitude determination, which in turn improves the geo-location of the target 104.

Man-portable targeting system 100 includes a targeting platform 106 having an unknown geo-location and sight orientation 107 in a reference coordinate system. The targeting platform is provided with a laser range finder 108 configured to provide an estimated range (R) to target and an imaging sensor 110 on said platform configured to image the target and determine a line-of-sight (LOS) 112 to the target with respect to the platform's sight orientation 107. A down finder 114 measures a pitch of the platform relative to gravity e.g. Earth reference. A first GPS antenna 116 and GPS receiver 118 are configured to receive GPS data 120 from multiple satellites 122 and determine the geo-location of the platform. Attitude means 123 such as a flux compass, inertial system or a second body-fixed GPS are configured to estimate the platform's sight orientation 107 in the reference coordinate system. A processor 124 is configured to determine the LOS to the target in the reference coordinate system from said platform's sight orientation and the target LOS with respect thereto and use that LOS, platform geo-location and range to target to estimate the geo-location of the distant target.

An operator 126 points the targeting platform in the general direction of target 104 so that imaging sensor 110 can capture the target. The operator may point the targeting platform directly at the target in which case the platform attitude 107 (boresight) and the LOS 112 to the target 104 coincide. The operator initiates target designation whereby the on-board processor 124 synthesizes the LOS, platform geo-location and platform attitude data gathered on-board the platform to measure the geo-location 128 (x,y,z) of the target. The man-portable targeting system 100 is fully self-contained to determine its attitude and to geo-locate the distant target. However, the accuracy of the attitude measurement and the geo-location of the target are limited by the accuracy of the on-board attitude system.

The man-portable targeting system 100 can be modified (or existing systems retro-fitted) for use with the baseline extension system 102 to improve the geo-location of the target. If the baseline extension system is not deployed or acquisition is lost (e.g. remote GPS antenna malfunctions, destroyed, outside EO sensor FOV or undetectable), the targeting system defaults to its on-board attitude determination system. When the baseline extension system 102 is deployed and the ball acquired, the on-board system may provide the necessary pitch information or may more generally provide information to over determine the system to further improve the robustness and accuracy of the system. For example, if the on-board system is itself a GPS system with a second body-fixed antenna, the GPS data from that antenna can be used to disambiguate roll (provide pitch) in place of the downfinder. Alternately, the on-board system may be ignored.

The baseline extension system 102 includes at least one man-portable ball 130, an EO sensor 134 on the platform, and processing means (e.g. within sensor 134 and processor 124) to estimate the orientation of the baseline with respect to the sight orientation of platform and estimate platform attitude. Ball 130 is configured to receive GPS data from at least some of the same said satellites as on-board antenna 116. The ball defines an extended baseline 132 to the on-board GPS antenna with an unknown orientation. In this embodiment the ball extracts time-stamped carrier phase difference data and communicates the data to the man-portable targeting system. EO sensor 134 is configured to acquire the ball and measure a first baseline orientation relative to the sight orientation of the platform. On-board processor 124 processes the GPS data from GPS receiver 118 and the time-stamped carrier phase difference data from the remote GPS antennas using the GPS interferometry described by Quinn to determine a second baseline orientation in the reference coordinate system. The processor provides an estimate of the platform's sight orientation in the reference coordinate system (platform attitude) from the first and second baseline orientations and the platform pitch and combines this with the LOS measurement, platform geo-location and range to target to estimate target geo-location 128. The use of the extended baseline increases the accuracy of the second baseline orientation, which in turn increases the accuracy of platform attitude, which in turn increases the accuracy of target geo-location 128.

A goal of baseline extension is to improve the pointing accuracy of the targeting system, which in turn improves the geo-location accuracy of the target. Assume the design specification of the targeting system require a capability to designate targets at a 5 Km range to within 2 meters of the stand-alone GPS positioning accuracy. This requires errors in the pointing accuracy to be constrained to less than about 400 micro radians. Allowing 100 micro radians for the LOS measurement, the platform attitude must be measured to within 300 micro radians. Using GPS interferometry this requires a GPS baseline of just less than 15 meters. A typical man-portable targeting system platform is approximately 0.5 meters in length. The required baseline is clearly impractical for such a man-portable system.

Figure 6:
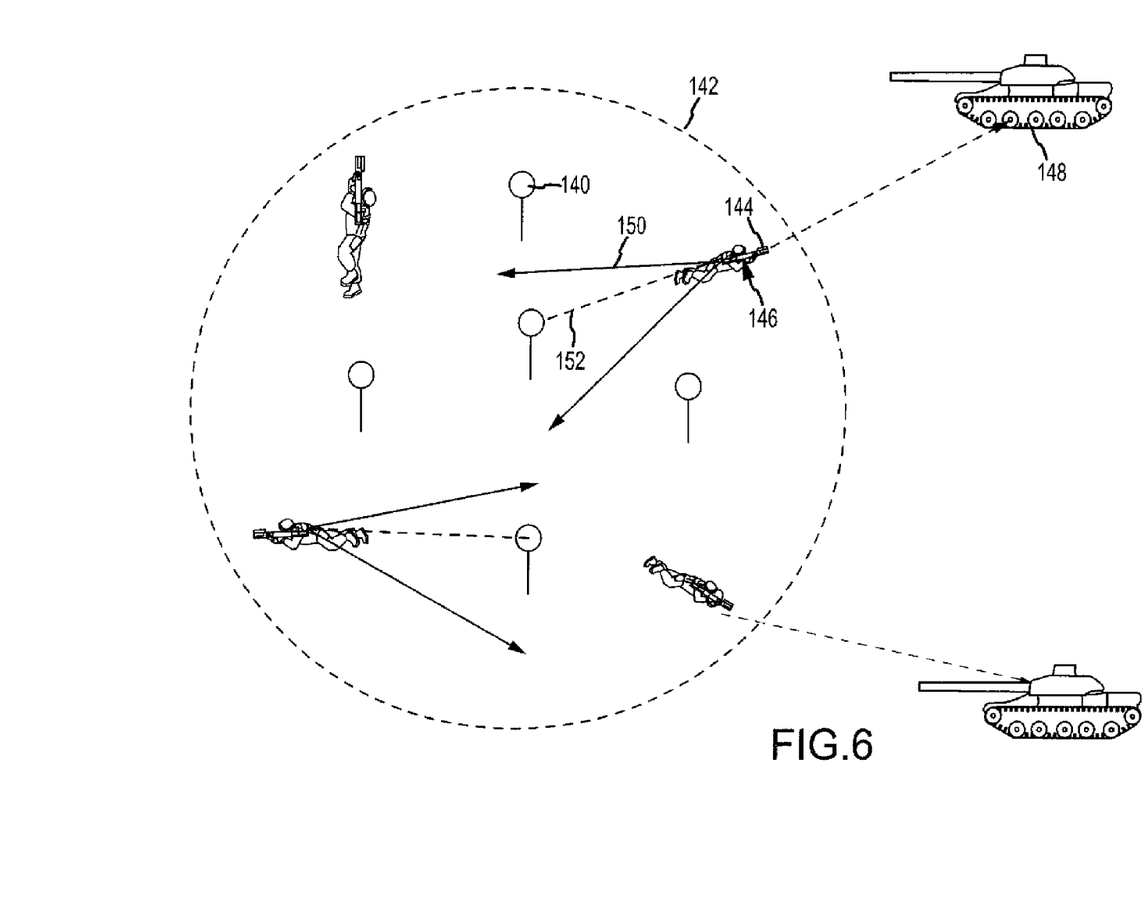
FIG. 6 is a diagram illustrating the use of multiple remote GPS balls to support remote target designation by multiple operators within a perimeter.

The operator may acquire other targets in the image sensor's FOV without re-pointing the targeting system. Alternately, the operator may point the targeting system at a new target thereby changing the orientation of the baseline to the targeting system. Should the operator point the targeting system such that the EO sensor cannot acquire the remote GPS antenna the targeting system will default to its on-board system, possibly with some notification to this effect to the operator. To allow for a larger effective FOV multiple remote GPS antenna can be positioned around the targeting system so that at least one lies within the FOV of the EO sensor over a desired targeting FOV. Furthermore multiple operators can use the same remote GPS antenna to provide an extended baseline to designate the same or different targets. The targeting system can be configured to acquire any GPS ball, not just those positioned by the particular operator. Although the GPS antenna are suitably designed to be man-portable with the targeting system for deployment at or near the time of target designation, as depicted in FIG. 6 one or more GPS balls 140 could be pre-positioned within a perimeter of operations 142 to allow operators 144 to move and reposition themselves and their targeting systems 146 quickly to designate a target 148 with a high probably of acquiring a GPS ball with their EO sensor's FOV 150 with an extended baseline 152. The perimeter could be around a fixed installation such as a camp, fuel depot etc. or could be a temporary configuration to either mount an attack on the enemy or repel an attacking enemy. The number and positioning of the GPS balls is suitably selected so that an operator at any point within the perimeter and oriented in any direction to designate a target has a high likelihood of both acquiring at least one GPS ball and that the baseline to that ball is extended to a minimum length to provide the desired accuracy.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

I claim:

1. A global positioning system (GPS) attitude determination system, comprising:
    a platform having an unknown sight orientation in a reference coordinate system;
    a first GPS antenna structurally attached to said platform and configured to receive GPS data from multiple GPS transmitters;
    a second GPS antenna structurally detached from said platform and configured to receive GPS data from at least some of the same said GPS transmitters, said second GPS antenna positionable away from the platform to define an extended baseline to the first GPS antenna on said platform with an unknown orientation;
    an electro-optical (EO) sensor on one of said platform or said second GPS antenna configured to acquire an EO observable reference feature on the other of said platform or said second GPS antenna and measure a first baseline orientation relative to the sight orientation of the platform;
    communication means for communicating GPS data between the second GPS antenna and the platform; and
    processing means for processing GPS data from both the first and second GPS antennas to determine a second baseline orientation in the reference coordinate system and estimating the platform's sight orientation in the reference coordinate system from said first and second baseline orientations and a platform pitch.

2. The GPS attitude determination system of claim 1, comprising a self-contained attitude determination system including said first GPS antenna for providing position of the platform in the reference coordinate system and attitude means for estimating the platform's sight orientation in the reference coordinate system, and further comprising a baseline extension system including the second GPS antenna, EO sensor, communication and processing means for providing a more accurate estimate of the platform's sight orientation.

3. The GPS attitude determination system of claim 2, wherein said attitude means comprises a third GPS antenna, a flux compass or an inertial system.

4. The GPS attitude determination system of claim 1, further comprising:
    a rangefinder on said platform configured to estimate a range to target; and
    an imaging sensor on said platform configured to image the target and determine a line-of-sight (LOS) to the target with respect to the platform's sight orientations
    said processing means on said platform determining the LOS to the target in the reference coordinate system from said platform's sight orientation and the target LOS with respect thereto.

5. The GPS attitude determination system of claim 4, wherein said platform is man-portable for operation by a user to designate the target and said second GPS antenna is man-portable and positionable prior to target designation.

6. The GPS attitude determination system of claim 1, wherein said platform and said second GPS antenna are man-portable.

7. The GPS attitude determination system of claim 1, wherein said EO sensor is on the platform and acquires the EO observable reference feature on the second GPS antenna.

8. The GPS attitude determination system of claim 1, wherein said EO sensor comprises a camera in the visible or near-visible band.

9. The GPS attitude determination system of claim 1, wherein said processing means determines the second baseline orientation using GPS interferometry.

10. The GPS attitude determination system of claim 9, wherein processing means are on said platform, said second GPS antenna includes a receiver that processes the GPS data from the GPS transmitters and transmits a carrier phase difference for each of the same said GPS transmitters and times at which the phase differences occurred to said processing means.

11. The GPS attitude determination system of claim 1, further comprising:
    a third GPS antenna structurally detached from said platform and configured to receive GPS data from at least some of the same said GPS transmitters,
    wherein said communication means communicates GPS data received by the third GPS antenna to said processing means.

12. The GPS attitude determination system of claim 1, further comprising:
    means for determining the platform pitch including at least one of a downfinder on the platform and a third GPS antenna.

13. A global positioning system (GPS) attitude determination system, comprising:
    a platform having an unknown sight orientation in a reference coordinate system;
    a first GPS antenna structurally attached to said platform and configured to receive GPS data from multiple GPS transmitters;
    a second GPS antenna having an electro-optical (EO) observable reference feature and configured to receive GPS data from at least some of the same said GPS transmitters, extract time-stamped carrier phase difference data and communicate the data to said platform, said second GPS antenna structurally detached from the platform to define an extended baseline to the first GPS antenna on said platform with an unknown orientation;
    an EO sensor on said platform configured to acquire the EO observable reference feature on the second GPS antenna and measure a first baseline orientation relative to the sight orientation of the platform;
    means for determining a pitch of the platform; and
    a processor on said platform for processing the GPS data and the time-stamped carrier phase difference data from the GPS antennas using GPS interferometry to determine a second baseline orientation in the reference coordinate system and estimating the platform's sight orientation in the reference coordinate system from said first and second baseline orientations and the platform pitch.

14. A global positioning system (GPS) attitude determination system for estimating the geo-location of a distant target, comprising:
    a man-portable targeting system including,
    a platform having an unknown geo-location and sight orientation in a reference coordinate system, a range finder configured to provide an estimated range to target, an imaging sensor on said platform configured to image the target and determine a line-of-sight (LOS) to the target with respect to the platform's sight orientation;

a down finder configured to provide a pitch of the platform relative to the reference coordinate system, a first GPS antenna and receiver configured to receive GPS data from multiple GPS transmitters and determine the geo-location of the platform;

attitude means for estimating the platform's sight orientation in the reference coordinate system; and a processor configured to determine the LOS to the target in the reference coordinate system from said platform's sight orientation and the target LOS with respect thereto and use the LOS, platform geo-location and range to target to estimate the geo-location of the distance target, and a baseline extension system including,
- a man-portable second GPS antenna having an electro-optical (EO) observable reference feature and configured to receive GPS data from at least some of the same said GPS transmitters, extract time-stamped carrier phase difference data and communicate the data to said man-portable targeting system, said second GPS antenna structurally detached from the platform to define an extended baseline to the first GPS antenna on said platform with an unknown orientation; and
- an EO sensor on said platform configured to acquire the EO observable reference feature on the second GPS antenna and measure a first baseline orientation relative to the sight orientation of the platform;

wherein the processor processes the GPS data and the time-stamped carrier phase difference data from the GPS antennas using GPS interferometry to determine a second baseline orientation in the reference coordinate system and provide an estimate of the platform's sight orientation in the reference coordinate system from said first and second baseline orientations and the platform pitch that is more accurate than the estimate provided by the man-portable targeting system's attitude means.

15. The global positioning system (GPS) attitude determination system of claim 14, wherein said attitude means comprises a third GPS antenna structurally attached to said platform defining a fixed baseline with a known orientation with respect to the platform sight orientation and a length less than the extended baseline.

16. A method of global positioning system (GPS) attitude determination for a platform having an unknown sight orientation in a reference coordinate system, comprising:

a) receiving GPS data from multiple GPS transmitters at a first GPS antenna structurally attached to said platform;

b) positioning a second GPS antenna having an EO observable reference feature away and structurally detached from said platform to define an extended baseline to the first GPS antenna on said platform with an unknown orientation;

c) electro-optically sensing images of the EO observable reference feature from the platform to acquire the second GPS antenna;

d) measuring a first baseline orientation relative to the sight orientation of the platform from EO sensed images of the second GPS antenna;

e) receiving GPS data from at least some of the same said GPS transmitters at the second GPS antenna;

f) communicating GPS data from the second UPS antenna to the platform;

g) determining a pitch of the platform;

h) processing the GPS data from both the first and second GPS antennas to determine a second baseline orientation in the reference coordinate system; and i) estimating the platform's sight orientation in the reference coordinate system from said first and second baseline orientations and the platform pitch.

17. The method of claim 16, wherein if the second GPS antenna is not acquired,
measuring that platform's sight orientation in the reference coordinate system on-board the platform to provide a default estimate that is less accurate than the estimate provided with the extended baseline.

18. The method of claim 16, further comprising manually porting the platform and second GPS antenna to a terrestrial location and positioning said second GPS antenna at said extended baseline.

19. The method of claim 16, further comprising repeating steps (b) through (f) for a third GPS antenna and in step (h) processing the GPS data from the first, second and third GPS antennas.

20. The method of claim 16, further comprising the steps of:

j) estimating a range from the platform to a target;

k) measuring a line-of-sight (LOS) to the target with respect to the platform's sight orientation;

l) determining the LOS to the target in the reference coordinate system from said platform's sight orientation and the target LOS with respect thereto; and m) using the LOS in the reference coordinate system, platform geo-location provided by the first GPS antenna and the range to target to estimate a geo-location of the distance target.

* * * * *

UNITED STATES PATENT AND TRADEMARK OFFICE
CERTIFICATE OF CORRECTION

| | | |
|---|---|---|
| PATENT NO. | : 7,468,695 B1 | Page 1 of 1 |
| APPLICATION NO. | : 11/780270 | |
| DATED | : December 23, 2008 | |
| INVENTOR(S) | : Williams | |

It is certified that error appears in the above-identified patent and that said Letters Patent is hereby corrected as shown below:

In column 12, line 16, delete "UPS" and insert --GPS--

Signed and Sealed this

Seventeenth Day of February, 2009

JOHN DOLL
*Acting Director of the United States Patent and Trademark Office*